Figure 1:
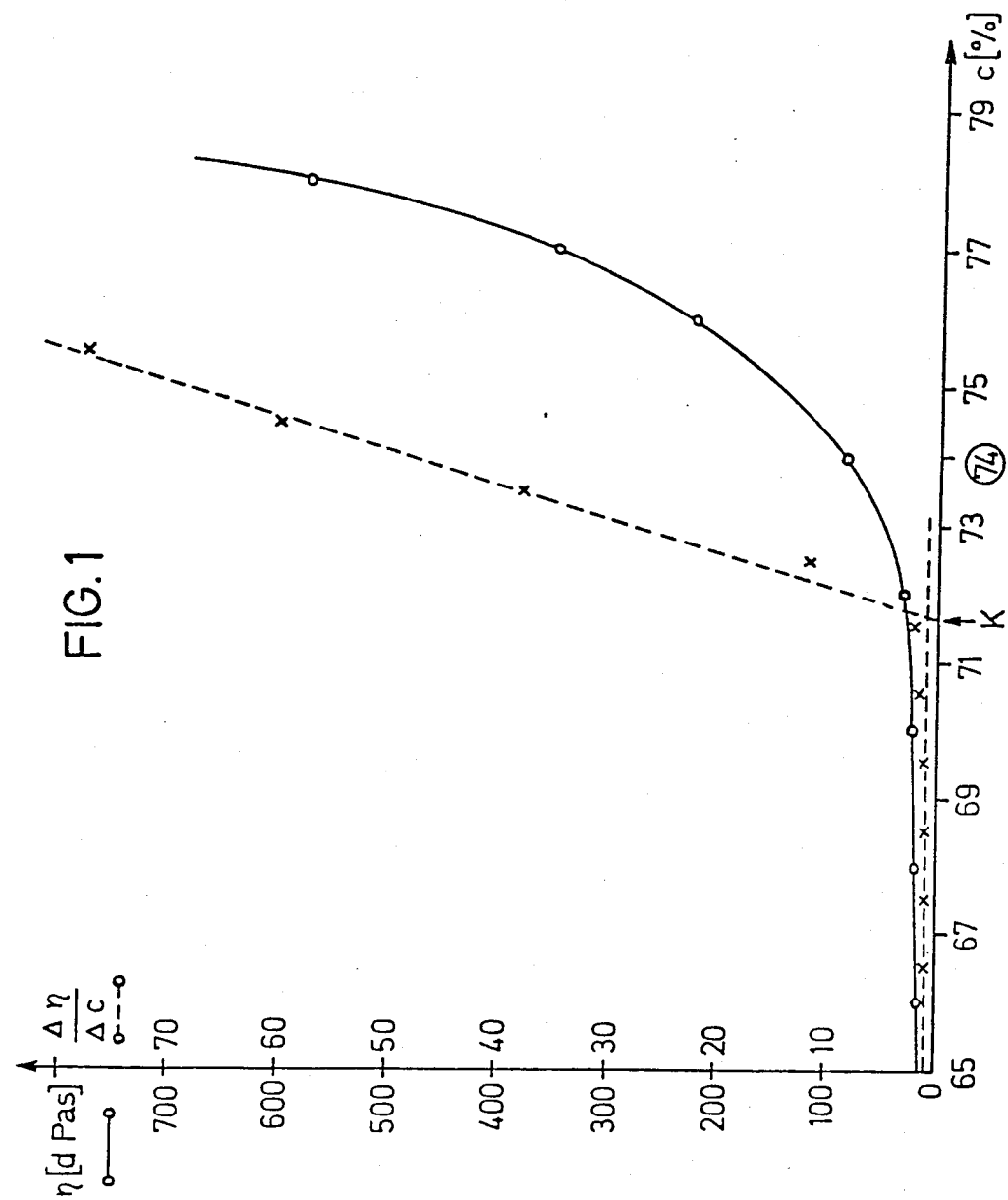

United States Patent [19]

Mahnke et al.

[11] Patent Number: 4,540,717

[45] Date of Patent: Sep. 10, 1985

[54] RESILIENT FOAM BASED ON A MELAMINE-FORMALDEHYDE CONDENSATE

[75] Inventors: Harald Mahnke, Ludwigshafen; Frank P. Woerner, Wachenheim; Heinz Weber, Gruenstadt; Guenter Kreibiehl, Ludwigshafen, all of Fed. Rep. of Germany

[73] Assignee: BASF Aktiengesellschaft, Fed. Rep. of Germany

[21] Appl. No.: 682,551

[22] Filed: Dec. 17, 1984

Related U.S. Application Data

[60] Division of Ser. No. 530,695, Sep. 9, 1983, , and a continuation-in-part of Ser. No. 400,050, Jul. 20, 1982, , and Ser. No. 330,373, Dec. 14, 1981, , which is a division of Ser. No. 242,561, Mar. 11, 1981, Pat. No. 4,334,971, said Ser. No. 530,695, is a continuation-in-part of Ser. No. 516,855, Jul. 25, 1983, , which is a continuation of Ser. No. 366,566, Apr. 8, 1982, , which is a continuation of Ser. No. 126,393, Jul. 20, 1982, abandoned.

[30] Foreign Application Priority Data

| Apr. 17, 1979 [DE] | Fed. Rep. of Germany | 2915457 |
| Apr. 17, 1979 [DE] | Fed. Rep. of Germany | 2915467 |
| Mar. 27, 1980 [DE] | Fed. Rep. of Germany | 3011769 |

[51] Int. Cl.³ ............................................. C08J 9/38
[52] U.S. Cl. .................................... 521/52; 521/187; 521/188
[58] Field of Search ........................ 521/52, 187, 188

[56] References Cited

U.S. PATENT DOCUMENTS

| 2,384,387 | 9/1945 | Meyer | 521/117 |
| 3,063,953 | 11/1962 | Eberl et al. | 521/918 |
| 3,093,600 | 6/1963 | Spencer et al. | 521/187 |
| 3,117,098 | 1/1964 | Eberl et al. | 521/52 |
| 3,160,596 | 12/1964 | Spencer et al. | 521/187 |
| 3,322,697 | 5/1967 | Czepiel | 521/52 |
| 3,522,196 | 7/1970 | Dorier et al. | 521/187 |
| 4,192,923 | 3/1980 | Tajkowski | 521/187 |
| 4,234,698 | 11/1980 | Inverarity | 521/187 |
| 4,334,971 | 6/1982 | Mahuke et al. | 204/159.21 |
| 4,390,643 | 6/1983 | Kanda et al. | 521/117 |

FOREIGN PATENT DOCUMENTS

| 870027 | 3/1953 | Fed. Rep. of Germany . |
| 2402411 | 7/1975 | Fed. Rep. of Germany . |
| 740403 | 1/1974 | South Africa . |
| 1161338 | 8/1969 | United Kingdom . |

*Primary Examiner*—Morton Foelak
*Attorney, Agent, or Firm*—Keil & Weinkauf

[57] ABSTRACT

A resilient foam, based on a melamine-formaldehyde condensate, which exhibits a number of important performance characteristics, namely:
(a) low bulk density
(b) low heat conductivity
(c) low compressive strength
(d) low modulus of elasticity
(e) large deflection on break
(f) low flammability The foam may be used particularly for heat and sound insulation in the construction industry.

20 Claims, 3 Drawing Figures

RESILIENT FOAM BASED ON A MELAMINE-FORMALDEHYDE CONDENSATE

This is a division of application Ser. No. 530,695, filed Sept. 9, 1983, which is a continuation-in-part application of Ser. No. 516,855, filed July 25, 1983, which is a continuation of Ser. No. 366,566, filed Apr. 8, 1982, which is a continuation of Ser. No. 126,393, now abandoned; Ser. No. 400,050, filed July 20, 1982, which is a continuation of Ser. No. 126,388, filed Mar. 3, 1980, now abandoned; and Ser. No. 330,373, filed Dec. 14, 1981, which is a division of Ser. No. 242,561, filed Mar. 11, 1981 and issued June 15, 1982 as U.S. Pat. No. 4,334,971.

Foams are employed for a variety of purposes, especially for heat and sound insulation in the construction industry. The most commonly used foams are based on thermoplastics, especially on styrene polymers. These possess excellent insulating properties and good mechanical properties, but because of the thermoplastic character of polystyrene their heat distortion point is low, in particular below 100° C. Foams based on thermoplastics are also highly flammable. An improvement in this respect can be achieved by adding halogen-containing flameproofing agents, but this is not an ideal solution because it affects the processing characteristics adversely, and because it can lead to the formation of hydrogen halides. Similar remarks apply to rigid polyurethane foams, which also have good mechanical properties and insulating properties, but are flammable and, when they burn, evolve toxic fumes. Thermosetting urea resins are also used to manufacture foams. These have the advantage of using a cheap raw material, but are very brittle and prone to crazing, and also are flammable.

It is true that foams based on melamine-formaldehyde condensates have been described in various patent publications, but they have not hitherto been employed industrially for heat or sound insulation in the construction industry. They are produced by stirring air into an aqueous melamine resin solution which contains an emulsifier and a curing agent. Such as described, for example, in German Pat. No. 870,027, have the serious disadvantage that they are very hard and brittle, and easily break or crumble when handled. It is alleged in French Pat. No. 1,073,642 that melamine resin foams can be produced by heating a resin powder in a mold under reduced pressure. This process, however, does not give useful resilient foams. U.S. Pat. No. 3,093,600 describes melamine resin foams which are said to have improved resilience and resistance to crazing as a result of the incorporation of triols, e.g. trimethylolpropane. However, it has been found that the resilience, and especially the recovery after compression, of such foams is inadequate for many applications. Furthermore, when substantial amounts of triols are incorporated, the flammability of the foams is substantially increased. U.S. Pat. No. 3,063,953 describes a process for improving the mechanical strength, resilience and softness of aminoplast resin foams, preferably those based on urea resins. It is true that by using this process the above properties of melamine resin foams produced by the prior art can be improved, but such improvement is not substantial. In particular, the tensile strength of such foams is far too low.

British Pat. No. 1,161,338 discloses a process for the preparation of foams based on phenolic, urea or melamine resins, wherein an aqueous resin solution which contains a blowing agent and a curing catalyst is foamed. On repeating the tests set forth in the Examples, it is found that the foams obtained—if any—are brittle, even in the phenolic or urea resins in the formulations are replaced by melamine resins.

German Laid-Open Application DOS 2,402,441 (equivalent to South African Patent Application 403/74) describes a process for the preparation of aminoplast foams, wherein a strong acid is added as a curing agent to an alkaline aminoplast precondensate containing a blowing agent. The heat liberated by the neutralization causes the blowing agent to boil and hence to foam. Since, in this process, curing and foaming take place simultaneously, relatively brittle foams result.

It is an object of the present invention to provide foams based on melamine/formaldehyde condensates which, when used as insulating materials, conform to the standards which the construction industry places on such materials. In particular, the foams should have good mechanical properties, i.e. they should be resilient, stable and easily handled. In addition, they should have acceptable flammability, i.e. they should, according to the classification of DIN 4,102, have no more than normal flammability but preferably have low flammability.

Another object of the present invention is to provide a process by means of which soft and resilient reticulated foams which are based on melamine/formaldehyde condensates and have a very low flammability are obtained.

A further object of the present invention is to permit the manufacture of foams of low density, namely even below 8 g.l$^{-1}$ and down to 1.6 g.l$^{-1}$, and the attainment of foam heights greater than 60 cm.

Accordingly, the invention relates to resilient reticulated foams based on a melamine/formaldehyde condensate which contains not less than 50% by weight, preferably not less than 80% by weight, of melamine and formaldehyde as condensed units, and up to 50% by weight, preferably up to 20% by weight, of other compounds containing amino, amide, hydroxyl or carboxyl groups and capable of forming thermosetting resins, and aldehydes which react therewith to foam such resins, as co-condensed units. The foams have the following characteristic properties:

(a) the bulk density, measured according to DIN 53,420, is from 4 to 80, preferably from 6 to 60, [g.l$^{-1}$];

(b) the heat conductivity, measured according to DIN 52,612, is less than 0.06, preferably less than 0.05 and especially less than 0.04 [W.m$^{-1}$.°K$^{-1}$];

(c) the compressive strength, measured according to DIN 53,577 at 60% compression, divided by the bulk density, is less than 0.3, preferably less than 0.2, [N.cm$^{-2}$/g.l$^{-1}$], and in determining the compressive strength at 60% compression, the foam must recover to not less than 70%, preferably not less than 80% and especially not less than 90% of its original height;

(d) the modulus of elasticity, measured by methods similar to DIN 53,423, divided by the bulk density is less than 0.25, preferbly less than 0.2 and especially less than 0.15, [N.mm$^{-2}$/g.l$^{-1}$];

(e) the deflection on break, measured according to DIN 53,423, is greater than 6, preferably greater than 9 and especially greater than 12, [mm];

(f) the foams are of not more than normal flammability, when assessed according to DIN 4,102; and (g) the tensile strength, measured according to DIN 53,571 is preferably not less than 0.07, in particular not less than 0.1, [N.mm$^{-2}$].

The invention for the first time provides industrially useful foams, based on melamine/formaldehyde condensates, for use in the construction industry. The foams not only have excellent heat insulating properties, because of their low density and their low heat conductivity but they are also good sound insulants because of their open-cell, i.e. reticulated character. They have the advantage over all conventional organic plastic foams that even without the addition of flameproofing agents they are of not more than normal flammability, and in the great majority of cases even of low flammability, when assessed according to DIN 4,102. In the event of a fire, the foam carbonizes without melting and dripping. The foam is also self-extinguishing when the flame is removed. Inasmuch as the starting materials for the production of melamine resins are $CO_2$, $NH_3$ and $CH_3OH$, the foam is made without using petroleum-based raw materials.

Figure 3:
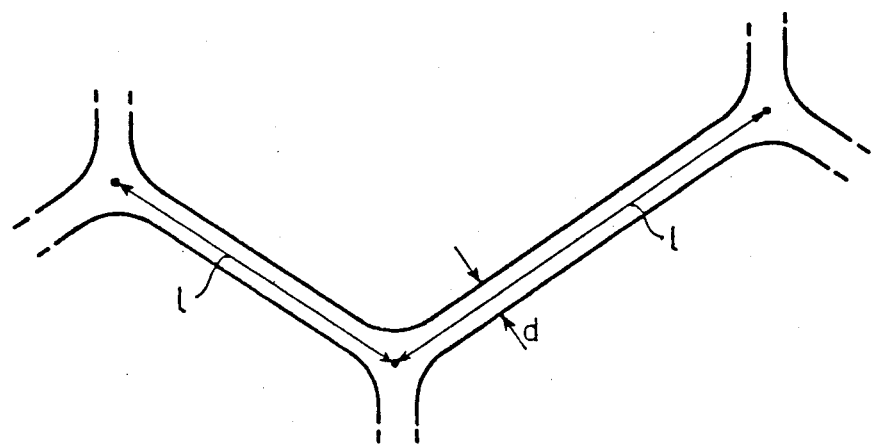

On microscopic examination of the foams produced according to the invention it is found that the foam structure comprises a plurality of mutually connected three-dimensionally branched webs (see FIG. 3). Melamine resin foams are sufficiently resilient only if the webs conform to the following conditions:

1. The mean length:width ratio must be greater than 10:1, preferably greater than 12:1 and in particular greater than 15:1.
2. The density of the webs must be greater than 1.10, preferably greater than 1.20, and in particular greater than 1.30 g/cm$^3$.

Webs which are too short (i.e. in which the l:d ratio is too low) are obtained if the curing process commences too early, before foaming has substantially ended. Too low a web density indicates that there are minor cavities, bubbles and the like in the interior of the webs, resulting from secondary foaming. Such secondary foaming occurs if the water content of the melamine resin precondensate is too high. In both cases, brittle foams are obtained.

The mean l:d ratio is determined microscopically, the length and width of the webs being determined by a statistical counting method. The web length is defined as the distance between the centers of two nodes, and the web width is defined as the narrowest part of a web, in each case measured on a photomicrograph. To determine the density of the foam webs, the foam is placed in a suitable liquid, for example isopropanol, with which it becomes fully impregnated by virtue of its open-cell character. The density of the webs is then determined by the principle of Archimedes.

The foams according to the invention are melamine/formaldehyde condensates which in addition to melamine can contain up to 50, preferably up to 20, % by weight of other compounds which form thermosetting resins, and in addition to formaldehyde can contain up to 50, preferably up to 20, % by weight of other aldehydes, as co-condensed units. However, the use of an unmodified melamine/formaldehyde condensate is particularly preferred. Examples of other compounds capable of forming thermosetting resins are alkyl-substituted melamine, urea, urethanes, carboxylic acid amides, dicyandiamide, guanidine, sulfurylamide, sulfonic acid amides, aliphatic amines, phenol and phenol derivatives. Examples of aldehydes which may be used are acetaldehyde, trimethylolacetaldehyde, acrolein, benzaldehyde, furfuraldehyde, glyoxal, phthalaldehyde and terephthalaldehyde. Further details concerning melamine/formaldehyde condensates are to be found in Houben-Weyl, Methoden der organischen Chemie, Volume 14/2, 1963, pages 319 to 402. The molar ratio of compound capable of forming a thermosetting resin to aldehyde can vary within wide limits ranging from 1:1.5 to 1:4.5; in the case of melamine/formaldehyde condensates it is preferably from 1:2.5 to 1:3.5. The degree of condensation of the precondensate should be sufficiently low to allow curing accompanied by further condensation. The mean molecular weight, measured osmometrically, can be from 200 to 1,000, preferably from 250 to 800. The melamine resins advantageously contain co-condensed sulfite groups. The sulfite groups may be introduced, for example, by adding from 1 to 20% by weight of sodium bisulfite during or after the condensation of the resin. The sulfite groups make the resin more hydrophilic and hence more compatible with water. Furthermore, higher degrees of condensation are achieved.

The foams according to the invention can contain up to 50, preferably up to 20, % by weight of conventional additives. Examples are fibrous and pulverulent inorganic reinforcing agents or fillers, such as glass fibers, metal powders, metal oxide, metal salts and silicates, e.g. talc, kaolin, quartz, baryte and chalk; pigments and dyes; flameproofing agents, e.g. halogen-containing and phosphorus-containing organic compounds; plasticizers, such as triols, e.g. trimethylolpropane, and acrylates; water-repellents, e.g. alkylphenols; and agents which lower the toxicity of cumbustion fumes, e.g. compounds of trivalent boron, divalent copper or trivalent iron, or which assist carbonization, e.g. sucrose. However, it is always preferred to dispense with the use of such additives. It is known, for example, that plasticizers increase the flammability of the foams. Plasticizers are therefore only added in cases where it is important to have very flexible foams. In that case it may become necessary to add flameproofing agents which are normally-especially in the case of unmodified melamine/formaldehyde condensates-not needed. Since the foams have an open-pore structure and can therefore absorb water, it may be necessary, for certain applications, to add from 0.2 to 5% by weight of a water-repellant.

The foams according to the invention exhibit an extremely low bulk density, which may be as little as 4 [g.l$^{-1}$]. When manufactured by the ultra-high-frequency irradiation method, the foams can exhibit a density of as little as 1.6 [g.l$^{-1}$]. The consequence of this low bulk density is that the foam raw material costs are very low. Higher densities, of up to 80 [g.l$^{-1}$], are only of interest for particular applications, for example in composite materials. Preferably, the bulk density is from 6 to 60, especially from 8 to 40, [g.l$^{-1}$]. The heat conductivity at 10° C. is less than 0.06, preferably less than 0.05 and especially less than 0.04 [W.m$^{-1}$.°K$^{-1}$]. Accordingly, it is less than in the case of soft polyurethane foams and of the order of magnitude found with polystyrene foams.

The advantageous mechanical properties are expressed in terms of the compressive strength, the modulus of elasticity, the deflection on break and the tensile strength. The modulus of elasticity is determined by a method based on DIN 53,423, the test speed being 5 [mm.min$^{-1}$] and the measurement being taken to a maximum deflection of 0.5 mm. The compressive strength and the modulus of elasticity are found to vary about proportionally to the density, so that the quotient of compressive strength to bulk density, or of modulus of elasticity to bulk density, can be employed to characterize the materials. A very important performance characteristic of the foams according to the invention is their recovery after compression. It is measured when determining the compressive strength and at 60% compression is found to be not less than 70%, preferably not less than 80% and especially not less than 90%. It is noteworthy that with freshly produced foam the first compression differs substantially from subsequent compressions. For the first compression, a somewhat greater force is required, evidently attributable to the fact that residual hard zones in the cell structure are destroyed. These hard zones can be destroyed by milling the foams. A further very important property is the flammability. When assessed according to DIN 4,102, the foams are of not more than normal flammability and preferably of low flammability. Normal flammability is confined to exceptional cases where, for example, a plasticizer has been added or a modifier (in the nature of a compound which forms aminoplasts), e.g. urea, has been co-condensed.

The foams according to the invention can be prepared by foaming an aqueous solution or dispersion which contains a melamine/formaldehyde precondensate, an emulsifier, a blowing agent and a curing agent, with or without conventional additives, and then curing the foam. We have found that particularly resilient foams are obtained if relatively highly concentrated solutions or dispersions, preferably of more than 68 percent strength by weight and especially of more than 72 percent strength by weight, are employed (the concentrations being based on the mixture of resin and water, without additive), and if foaming is carried out under conditions such that initially there is only a slight rise in viscosity and the process of curing, with substantial increase in viscosity, only commences when the foaming process has been substantially completed.

A preferred process for the preparation of the resilient foam based on a melamine-formaldehyde condensate comprises the following steps:

(a) the concentration of the precondensate in the mixture of precondensate and water (without additives) is selected to be above the salient point of the 1st derivative of the curve which is obtained when, keeping all other conditions constant, the amount of water in the mixture of precondensate and water is varied and the viscosity of the mixture (measured at the boiling point of the blowing agent under the conditions prevailing at the start of foaming) is plotted against the concentration of the precondensate, which concentration must however not be higher than the value which in the curve described corresponds to a viscosity of 5,000 dPas, preferably 2,000 dPas and especially 1,000 dPas;

(b) during the foaming process, up to the time at which the foam has reached 80% of the maximum attainable rise height, the viscosity of the aqueous solution or dispersion must not fall below the value which, in the curve described under (a), corresponds to the minimum concentration defined there, but must not exceed 6,000 dPas, preferably 2,500 dPas and especially 1,200 dPas; and (c) after reaching the time defined under (b), the viscosity exceeds a value of 10,000 dPas, due to curing of the precondensate, within 8 minutes, the viscosities referred to in (b) and (c) being measured, in each case, on a parallel system which is free from blowing agent.

This process surprisingly gives resilient, soft reticulated foams which when used as insulating materials meet the standards placed by the building trade on such materials, especially with respect to their heat-insulating and sound-insulating properties, their mechanical properties and their behavior on exposure to fire. The foaming of very concentrated solutions or dispersions must be regarded as a bold step into technologically new territory, since the art has always avoided using melamine resin concentrations which are so high that, in particular, the dispersions are not stable on storage.

The aqueous solution or dispersion of the melamine resin contains an emulsifier, preferably in an amount of from 0.5 to 5% by weight, and especially from 1.0 to 3.0% by weight, based on resin. The purpose of the emulsifier is to disperse the organic blowing agent homogeneously in the aqueous solution or dispersion. Accordingly, the emulsifier ensures the stability of the system and prevents phase separation during foaming; such phase separation would result in an inhomogeneous foam. The higher the foaming temperature, the more effective the emulsifier must be, and the higher should be the concentration used. The emulsifier furthermore acts as a nucleating agent for the foaming process. Suitable materials are anionic compounds, especially metal alkylsulfonates and alkylarylsulfonates, where alkyl is of 8 to 20 carbon atoms, the metal preferably being sodium; metal salts of sulfosuccinic acid esters, sulfonated castor oils, alkylnaphthalenesulfonic acids, phenolsulfonic acids and sulfuric acid esters, for example $C_{12}$-$C_{18}$-alkyl hydrogen sulfates and $C_{16}$-$C_{18}$-fatty alcohol hydrogen sulfates, are also suitable, as are cationic compounds, e.g. oleic acid triethanolamine ester and laurylpyridinium chloride, and non-ionic compounds, e.g. oxyethylated caster oil, oxyethylated tallow alcohols, oxyethylated stearic acid or oleic acid, and oxyethylated nonylphenol.

The aqueous solution or dispersion additionally contains a volatile blowing agent, preferably boiling at from $-20°$ to $100°$ C., especially from $+20°$ to $+80°$ C. Examples are hydrocarbons, halohydrocarbons, alcohols, ketones, ethers and esters. Preferred blowing agents are pentane, hexane, trichlorofluoromethane and trichlorotrifluoroethane. The amount of blowing agent depends on the desired density of the foam and can be from 1 to 50% by weight, preferably from 5 to 40% by weight, based on resin. These blowing agents are uniformly distributed in the aqueous solution or dispersion. Such agents vaporize on heating, and cause the materials to foam. It is also possible to force gases under pressure into the aqueous solution or dispersion and bring about the foaming process by releasing the pressure. Finally, it is also possible to introduce into the mixture chemical compounds which react, or decompose, with the formation of a gas, and to bring about the reaction or decomposition by heating.

The curing agents employed are compounds which under the reaction conditions split off, or form, protons, which then catalyze the further condensation of the melamine resin. The amount used is from 0.01 to 20, preferably from 0.05 to 5, % by weight, based on the resin. Examples of suitable compounds are inorganic and organic acids, e.g. hydrochloric acid, sulfuric acid, phosphoric acid, formic acid, acetic acid, oxalic acid, lactic acid and amino acids, and latent curing agents, e.g. salts of halocarboxylic acids, chloroacetamide, hydrogen phosphates, acid anhydrides and ammonium salts. Formaldehyde itself can also undergo disproportionation at elevated temperatures, to form formic acid, and can thus act as a curing agent.

The aqueous solution or dispersion is preferably free from additives. For some purposes, however, it can be advantageous to add up to 20% by weight, but preferably less than 10% by weight, based on resin, of conventional additives, such as fibrous or pulverulent inorganic reinforcing agents or fillers, pigments, dyes, flameproofing agents, plasticizers, agents for reducing the toxicity of the gas evolved on combustion or agents to promote carbonization. Since the foams have an open-cell structure and can absorb water, it may be necessary, for some purposes, to add from 0.2 to 5% by weight of a water-repellent agent. Examples are alkylphenols, where alkyl is of 5 to 15 carbon atoms, silicons and paraffins.

The additives are mixed homogeneously with the aqueous solution or dispersion of the melamine resin, during which mixing the blowing agent can be forced in, where appropriate under pressure. However, it is also possible to start from a solid, for example spray-dried, melamine resin and to mix this with the blowing agent and with an aqueous solution of the emulsifier and of the curing agent. The sequence of addition of the components depends on the particular mixing process. The mixture is brought to the boiling point of the blowing agent in the solution or dispersion at the prevailing pressure. This may be done by heating, for example with hot air, steam or high frequency radiation, or by utilizing the heat of reaction. On being brought to this temperature, the blowing agent is transformed to a gas and is thus able to cause the mixture to foam. During the isothermal foaming, the aqueous solution or dispersion assumes the boiling point of the blowing agent at the prevailing pressure. Preferably, the process is carried out under atmospheric pressure, with the material at from 20° to 80° C., though the temperature of the surroundings may be substantially higher.

A critical feature (a) of the preferred process is the concentration of the precondensate in its mixture with water (without additives). The optimum concentration is different for every foaming temperature, i.e. it depends on the nature of the blowing agent. In this preferred process, the minimum concentration must conform to the condition that it should lie above the salient point of the 1st derivative of the curve which is obtained when, keeping all other conditions constant, the amount of water in the mixture of precondensate and water is varied and the viscosity of the mixture (measured at the boiling point of the blowing agent under the conditions prevailing at the start of foaming) is plotted against the concentration of the precondensate. In practice, the minimum concentration is determined by preparing mixtures of precondensate and water, containing various amounts of the latter, and then heating these mixtures to a temperature at which the blowing agent would boil under the pressure envisaged for the start of foaming. The corresponding viscosity for each concentration of the melamine resin is then measured under these conditions. Thereafter, the measured viscosity is plotted against the particular concentration. The initial part of the resulting curve has the shape of a straight line of only slight slope, but then rises progressively more rapidly and ultimately assumes a paraboloid course. The 1st derivative of this curve is obtained by graphical methods. It is initially in the form of a horizontal straight line, followed by a curved salient region, and ultimately becomes a steep straight line. The salient region in general extends over a range of at most about 1% difference in concentration of the precondensate. This region represents the minimum concentration of the melamine resin. If it is desired to locate the salient point even more precisely, the straight line portions of the curve representing the 1st derivative are extrapolated and their point of intersection is determined. The upper limit of the melamine resin concentration must conform to the following condition: it must not exceed the value which, in the curve described, corresponds to a viscosity of 5,000 dPas, preferably 2,000 dPas and especially 1,000 dPas.

For the preferred blowing agents, the preferred resin concentrations, which lie within the range defined above, are as follows:

n-pentane: from 70 to 80, preferably from 72 to 79, especially from 73 to 78.5, % by weight;

n-hexane: from 73 to 85, preferably from 74 to 84, and especially from 78 to 83, % by weight;

trichlorofluoromethane: from 68 to 78, preferably from 69 to 77, especially from 70 to 76, % by weight;

trichlorotrifluoroethane: from 72 to 82, preferably from 74 to 80, % by weight.

The above concentrations are again based on the mixture of precondensate and water, without additives.

The second critical feature (b) of the preferred process is that during foaming, up to the time at which the foam has reached 80% of the maximum attainable rise height, the viscosity of the aqueous solution or dispersion must not fall below the value which corresponds, on the curve described under (a), to the minimum concentration defined under (a), but must not exceed 6,000 dPas.

The third critical characteristic (c) means that after reaching the time defined under (b) the viscosity must, due to curing of the precondensate, exceed a value of 10,000 dPas within 8 minutes, preferably within 6 minutes, especially within 4 minutes, i.e. the resin must have cured within this time. The two conditions (b) and (c) ensure that foaming and curing are correctly balanced; for a given blowing agent and hence a given foaming temperature, the two conditions can be met if the nature and amount of the curing agent are correctly chosen. In practice, two aqueous solutions or dispersions are prepared, of which one contains the melamine resin in the concentration determined according to (a), the emulsifier, the curing agent, the blowing agent and the additives, if any, while the other contains the same constituents, but without blowing agent. Both systems are then brought to the foaming temperature. The parallel batch comprising the solution or dispersion which is free from blowing agent must be prepared since the system containing blowing agent foams under these conditions and hence its viscosity cannot be measured. For the first system, the rise height of the foam is plotted against time in order to determine the time at which the foam has reached 80% of the maximum attainable rise height. Using the second system, the viscosity is measured as a function of time. The results are then checked as to whether the requirements stated under (b) and (c) are met. Should this not be the case, the curing conditions must be varied, and this can best be achieved by varying the nature and amount of the curing agent and, where necessary, also by selecting a different blowing agent and hence a different foaming temperature. In the latter case, however, the optimum concentration of the melamine resin would have to be determined afresh, in accordance with (a).

A resilient, stable foam of low density is only obtained if during foaming and curing the conditions specified under (a), (b) and (c) are observed. If the initial concentration of melamine resin is too low, or if the viscosity drops below the defined initial viscosity before the foam has reached 80% of its maximum rise height, brittle foams are obtained, as with the prior art processes. If solutions or dispersions which are initially too viscous are employed, or if the viscosity increases above the defined permissible limit before 80% of the maximum foam rise height has been reached, the foaming pressure no longer suffices for satisfactory foaming, and the foams obtained are too dense and insufficiently resilient. If, after reaching 80% of the maximum rise height of the foam, the viscosity increases too slowly, i.e. if the foam does not cure sufficiently rapidly, it collapses and a brittle, non-homogeneous foam having too high a density is produced.

Preferably, the pressure in the foaming apparatus, and hence the material temperature during foaming, are kept constant. However, these conditions can be varied in the course of the foaming process. The foaming process in general requires from 20 seconds to 20 minutes, preferably from 30 seconds to 10 minutes, depending on the nature and intensity of heating employed. The foaming process is considered to have been completed when the resin has finished foaming and has cured to the point that it retains its shape.

The manufacture of the resilient foam can be carried out batchwise or continuously. In continuous operation, which is preferred, the aqueous solution or dispersion is advantageously applied to a continuously moving, preferably heated, metal belt, on which it is spread uniformly and then foamed and cured in a heated tunnel. To prevent the formation of a brittle skin on the surface of the foam, the foaming process can advantageously be carried out between two plastic films travelling synchronously with the metal belt. This foaming can be followed directly by the heat treatment and/or milling treatment.

In a special embodiment of the invention, a resilient foam of very low density is manufactured by foaming an aqueous or alcoholic solution or dispersion which contains a melamine-formaldehyde precondensate, an emulsifier, a blowing agent and a hardener, with or without conventional additives, and then crosslinking the precondensate, wherein, to effect foaming and crosslinking, the solution or dispersion is heated by ultra-high-frequency irradiation in such a manner that the power uptake by the solution or dispersion is from 5 to 200 KW per kg of water or alcohol in the solution or dispersion.

Using this process, it is possible to produce foams, based on melamine-formaldehyde condensates, which have a density of less than 8 g.l$^{-1}$ and a foam height in excess of 60 cm.

We have found, surprisingly, that in this process the volume of the foam is substantially greater than the gas volume of the blowing agent employed. In thermal foaming, foam formation is virtually only due to the blowing agent which is employed and which on heating forms a gas, i.e. one mole of blowing agent gives at most 22.4 liters of foam under standard conditions of temperature and pressure. In the process according to the special embodiment of the invention, surprisingly, substantially more foam, for example five times as much, is formed. This phenomenon is attributable to the fact that the ultra-high-frequency irradiation of the aqueous melamine resin solution or dispersion causes not only volatilization of the blowing agent employed, but also of water, which acts as an additional blowing agent. This effect is of great industrial importance, inasmuch as in this way much less of the volatile blowing agent need be employed and volatilized and accordingly the process causes substantially less pollution of the environment than the prior art process, or substantially smaller amounts of volatilized blowing agent need be recovered.

The principal blowing agent in the process according to the special embodiment of the invention is the water or the alcohol present as solvents in the system. Preferably, an auxiliary blowing agent of the type described above is admixed to the aqueous solution or dispersion, and for this purpose pentane, hexane, trichlorofluoromethane and trichlorotrifluoroethane are preferred. It is advantageous if the boiling point of the auxiliary blowing agent is substantially below that of the solvent because the sequence in which the auxiliary blowing agent and the (principal) blowing agent are volatilized is of considerable importance. Since the foam volume produced is very largely attributable to the volatilized water and only a minor proportion is due to the auxiliary blowing agent, it can be assumed that the latter serves as a nucleating agent. The toal amount of blowing agent depends on the desired final density of the foam; for densities of 1.6 g.l$^{-1}$ and 30 g.l$^{-1}$ it is, respectively, about 28 moles and about 1.5 moles per kg of resin. The molar amounts in each case relate to the effective total blowing gas. Preferably, from 1 to 40% by weight, based on the resin, of a physical auxiliary blowing agent having a boiling point of from 0° to 80° C. is added to the aqueous solution or dispersion; in the case of pentane, it is preferably from 5 to 15% by weight; in the case of trichlorofluoromethane from 15 to 25% by weight and in the case of trifluorotrichloroethane from 25 to 35% by weight.

A further advantage of this process is that the finished foam can be taken out of the foaming installation in a virtually dry state. Furthermore, it would be difficult, if not impossible, to emulsify, in the dispersion of solution, the large amounts of blowing agent required to achieve very low densities (less than 4 g.l$^{-1}$) and such densities are therefore only achievable through the water also acting as an essential blowing agent.

The solutions or dispersions employed in the special embodiment of the invention can be of lower concentration than those used in the preferred process described above. Here, the concentration of melamine-formaldehyde precondensate in the mixture of precondensate and solvent can vary within wide limits, namely from 55 to 85, preferably from 63 to 80, % by weight. The preferred viscosity of the mixture of precondensate and solvent is from 1 to 3,000 dPas, preferably from 5 to 2,000 dPas.

On foaming the solution or dispersion of the precondensate, there is at first a slight rise in viscosity, during which further condensation of the precondensate occurs. The crosslinking of the condensate, with a large increase in viscosity, only begins when the foaming process is substantially complete.

When physical auxiliary blowing agents are used, the mixture is brought to the boiling point of the blowing agent in the solution or dispersion at the particular pressure. In the case of chemical blowing agents, the solution or dispersion must be heated to a temperature at which the blowing gas is liberated at an adequate rate.

The requisite heating of the solution or dispersion is effected by ultra-high-frequency irradiation. Such irradiation can in principle employ microwaves in the frequency range of from 0.2 GHz to 100 GHz. For industrial operation, frequencies of 0.915, 2.45 and 5.8 GHz are available, among which 2.45 GHz is particularly preferred. The source of the radiation is a magnetron, and irradiation can also be carried out with several magnetrons simultaneously. Care should be taken to ensure very uniform field strength distribution during irradiation.

The irradiation of the foamable mixture is carried out in a treatment chamber. In batchwise operation of the invention, the chamber is closed on all sides. In principle, however, continuous irradiation is also possible, with the mixture being spread uniformly on a continuously running belt and being led past the radiation source through a channel-like treatment zone, open at each end.

The irradiation is carried out under such conditions that the power taken up by the solution or dispersion is from 5 to 200 KW, preferably from 9 to 120 KW, per kg of water in the solution or dispersion. If the power uptake is less, foaming no longer occurs and the mixture merely hardens. Within the preferred range, the foaming of the mixture is the faster, the greater is the power uptake, but above 200 KW per kg of water the foaming rate no longer shows a substantial increase.

The power uptake cannot be measured directly, but a direct measurement of the power emitted by the irradiation source and of the power reflected by the substrate is possible. Neglecting the slight conductivity losses, the power uptake corresponds to the difference between the emitted and the reflected power. As long as there is sufficient water present in the substrate, the ratio of emitted power to reflected power is about 10:1. This ratio drops drastically when the water, which constitutes the main absorber of microwaves, has been removed by evaporation from the substrate. This is the point at which the irradiation should be discontinued. The foaming process in general requires from 15 seconds to 20 minutes, preferably from 25 seconds to 10 minutes. In particular, the foaming time depends on the chosen power uptake of the solution or dispersion; the lower the uptake, the longer the irradiation must be continued.

On irradiation, the substrate first comes to the boiling point of the auxiliary blowing agent at the prevailing pressure. When this blowing agent has volatilized, the temperature rises to the boiling point of water. Advantageously, the foaming is carried out under reduced pressure, preferably at 400–900 mbar.

In a further preferred embodiment of the invention, the finished foam is subjected to an additional heating, namely for from 1 to 180 minutes, preferably from 3 to 60 minutes, at from 120° to 260° C., preferably from 150° to 250° C., during which water, blowing agent and formaldehyde are substantially removed and final hardening of the resin foam occurs. This heating can take place immediately after the manufacturing of the foam, in the same apparatus, or in a downstream apparatus. This heating step, however, can also be carried out at a later step, independently of the foaming process. Foams which have been heated in this way show substantially less tendency to shrink and have a lower equilibrium moisture content than products which have not been heated. The emission of formaldehyde is also greatly reduced. The heating can be carried out either thermally or by irradiation with microwaves of frequency 2.45 GHz.

In a still further preferred embodiment of the invention, the foam, before or after the optional heat treatment, is compressed one or more times by from 40 to 90% of its original height, and is then allowed to recover. This milling process presumably destroys residual hard zones in the cellular structure which leads to an increase in the resilience of the foam and to less shrinkage on storage under warm conditions.

The foams can be produced in the form of slabs or webs having a thickness of up to about 50 cm, or in the form of sheets only a few mm thick. In batchwise operation, molded articles can also be produced. In the special embodiment of the invention, when using microwaves of frequency 2.45 GHz, the preferred foam thickness (in the foam rise direction) is from 60 cm to 150 cm. On one or both sides, the foams can be provided with covering layers or be laminated with, for example, paper, cardboard, glass mat, wood, gypsum boards, metal sheets or foils, or plastic films, which may also be foamed.

The main field of use of the foams produced according to the invention is heat insulation and sound insulation in buildings and building components, especially partitions, but also roofs, facades, doors and floors, as well as in vehicles and aircraft, and low temperature insulation, for example, in cold storage units, oil tanks and liquefied gas containers. Other fields of use are as an insulating wall cladding and as an insulating and shock-absorbing packaging material, as an bandaging material and, because of its spongy structure, as a cleaning material. The foams may also be used as a carrier for plant seed, for example grass seed, which is fixed therein. When supplied in the reel, the material can be spread readily. Flock of the foam according to the invention can be employed as a means of lightening heavy soils, as a moisture-regulating agent and as a carrier for fertilizers.

In the Examples which follow, parts and percentages are by weight. The percentages of emulsifier, curing agent and blowing agent are in each case based on the weight of anhydrous melamine resin.

EXAMPLE 1

A spray-dried melamine/formaldehyde precondensate (molar ratio 1:3, molecular weight about 400) was added, in an open vessel, to an aqueous solution containing 3% of formic acid and 1.5% of a mixture of sodium alkylsulfonates, where alkyl is of 12 to 18 carbon atoms (Emulgator K 30 from Bayer AG), the percentages being based on melamine resin. The concentration of the resin, based on its mixture with water, was 74.0%. The mixture was stirred vigorously and 20% of pentane were then added. Stirring was then continued until, after about 3 minutes, a homogeneous dispersion had formed. This dispersion was knife-coated onto a PTFE-coated glass fabric as the base material and foamed and cured in an oven at an air temperature of 150° C. Under these conditions, the foam assumed a temperature equal to the boiling point of pentane, which under these conditions was 37.0° C. After 4½ minutes, the foam had reached 80% of its maximum rise height, the latter being ultimately reached after 7 to 8 minutes. The foam was left for a further 10 minutes in the oven at 150° C.

It was then heated for 30 minutes at 180° C. The properties of the foam are shown in Table 1.

To determine the optimum melamine resin concentration, the dependence of the viscosity of the dispersion on the melamine resin concentration had been measured as follows, before the foaming process: Mixtures of the melamine resin precondensate and water in various ratios were prepared. The mixtures were then heated at 37.0° C. and their viscosity was determined in a rotary viscometer. The viscosity $\eta$ in dPas was plotted as a graph (see FIG. 1) against the concentration c in % by weight of solids. The 1st derivative $\Delta\eta/\Delta c$ of the resulting curve was obtained graphically and plotted on the graph in the form of two straight lines intersecting at the salient point K. In the present case, this point is at a concentration of 71.7%. The curve asymptotically approaches a concentration of about 80%, so that the preferred maximum viscosity of 1,000 dPas corresponds to a concentration of about 79%. For the foaming procedure described in the Example, the concentration chosen was about halfway between these values, namely 74.0%. The corresponding viscosity was 88 dPas.

Figure 2:
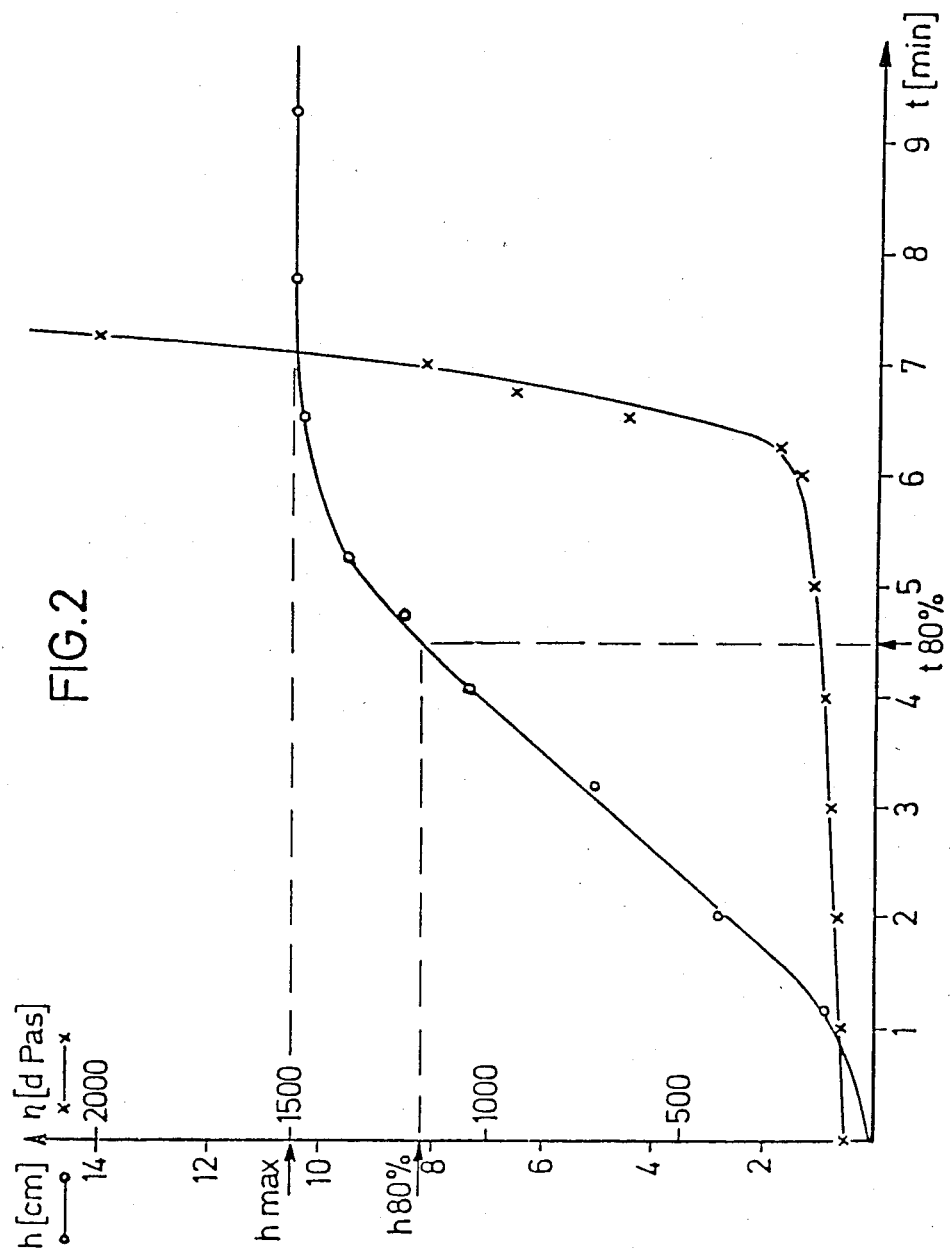

The ratio of the components in the mixture to be foamed was then selected to give a ratio of melamine resin to water (including the water introduced with the curing agent and the emulsifier) of 74:26. Before the actual foaming process, the maximum rise height and the dependence of the viscosity on time were determined in two trial batches. To do this, the mixture described above, in one case with and in one case without added blowing agent, was heated to the foaming temperature. FIG. 2 shows a graph in which the rise height h and the viscosity $\eta$ have been plotted against time t. The maximum rise height was 10.25 cm; 80% of the maximum rise height was reached after 4½ minutes. At that time, the viscosity was 170 dPas. After a further 3 minutes, the viscosity had exceeded a value of 10,000 dPas.

EXAMPLE 2

The procedure followed was as in Example 1, except that instead of 20% only 13% of pentane was employed.

EXAMPLE 3

The procedure followed as as in Example 1, but 3% of sulfuric acid was used as the acid, 1.5% of sodium dodecylbenzenesulfonate as the emulsifier and 28% of trichlorotrifluoroethane as the blowing agent. The resin concentration was 76%. The material temperature, during foaming, was 47° C. The foam was not heat-treated.

EXAMPLE 4

The procedure followed was as in Example 1, but 6% of phosphoric acid, 1.5% of sodium lauryl-sulfonate and 12% pentane were used. A melamine resin with a molar ratio of melamine to formaldehyde equal to 1:3.5 was employed. The resin concentration was 74%. The foam was not heat-treated.

EXAMPLE 5

2.8% of formic acid and 1.4% of the alkylsulfonate from Example 1 were added to a solution of a melamine resin in an open vessel, the percentages being based on resin. The concentration of resin, based on its mixture with water, was 75.5%. 20% of pentane was added with vigorous stirring. Foaming, curing and heating were carried out as in Example 1.

EXAMPLE 6

The procedure followed was as in Example 5, using a melamine resin with a molar ratio of melamine to formaldehyde equal to 1:2.5. The resin concentration was 76%. 0.20% of formic acid was used as the curing agent, 3% of the alkylsulfonate from Example 1 plus 0.3% of an oxyethylated saturated fatty alcohol (with a low degree of oxyethylation) were used as the emulsifier, and 23% of n-hexane were used as the blowing agent. The material temperature during foaming was 69.0° C. The foam was heat-treated as in Example 1.

EXAMPLE 7

The homogeneous mixture described in Example 1 was applied to a metal belt travelling continuously at a speed of 0.4 [m.min$^{-1}$], the belt being heated to about 130° C. The mixture was uniformly spread on the belt, as a layer about 2 mm thick, by means of a knife coater. It was then foamed in a foaming tunnel heated by air at 150° C., with the material temperature assuming a value of 37.0° C. After about 4½ minutes, 80% of the ultimate rise height of the foam was reached, and after about 6 minutes the final height of 15 cm was attained. The foam was then passed through the foaming tunnel for a further 7 minutes, during which the material temperature rose to about 98° C. Thereafter, the foam was heated for 15 minutes at a material temperature of about 170° C., and the block was then trimmed.

EXAMPLE 8

The procedure followed was as in Example 6, using a melamine resin with a molar ratio of melamine to formaldehyde equal to 1:2.0. The resin concentration was 80%. 2.5% of formic acid was used as the curing agent, a mixture of 0.6% of sodium diisobutylnaphthalenesulfonate and 1.6% of an oxyethylated saturated fatty alcohol (with a low degree of oxyethylation) was used as the emulsifer and 16% of pentane was used as the blowing agent.

EXAMPLE 9

The procedure followed was as in Example 1, using 1.8% of formic acid as the acid and 2.2% of sodium dodecylbenzenesulfonate as the emulsifier. The heat treatment was carried out at 190° C.

TABLE

| Example | Bulk Density [g·l$^{-1}$] | Heat conductivity [W·m$^{-1}$·°K$^{-1}$] | Compressive strength [N·cm$^{-2}$] | Compressive strength Bulk density | Recovery % | Modulus of elasticity [N·mm$^{-2}$] | E-modulus Bulk density | Deflection [mm] | Tensile strength [N·mm$^{-2}$] | Combustion characteristics | Web length Web thickness | Web density g·cm$^{-3}$ |
|---|---|---|---|---|---|---|---|---|---|---|---|---|
| 1 | 13 | 0.0325 | 1.3 | 0.10 | >90 | <1.0 | 0.08 | >20 | 0.12 | low flammability | >15 | >1.3 |
| 2 | 20 | 0.032 | 3.0 | 0.15 | >90 | 2.0 | 0.10 | 15 | 0.12 | low flammability | >10 | >1.3 |

TABLE-continued

| Example | Bulk Density [g·l⁻¹] | Heat conductivity [W·m⁻¹·°K⁻¹] | Compressive strength [N·cm⁻²] | Compressive strength Bulk density | Recovery % | Modulus of elasticity [N·mm⁻²] | E-modulus Bulk density | Deflection [mm] | Tensile strength [N·mm⁻²] | Combustion characteristics | Web length Web thickness | Web density g·cm⁻³ |
|---|---|---|---|---|---|---|---|---|---|---|---|---|
| 3 | 30 | 0.033 | 5.5 | 0.18 | >90 | 3.5 | 0.12 | 11 | 0.12 | low flammability | >10 | >1.3 |
| 4 | 28 | 0.033 | 5.0 | 0.18 | >90 | 3.0 | 0.11 | >12 | 0.10 | low flammability | >10 | >1.3 |
| 5 | 13 | 0.034 | 1.2 | 0.09 | >90 | <1.0 | ·0.08 | >20 | 0.11 | low flammability | >12 | >1.3 |
| 6 | 14 | 0.034 | 1.3 | 0.09 | >90 | 1.0 | 0.07 | >20 | 0.12 | low flammability | >12 | >1.3 |
| 7 | 12 | 0.032 | 1.2 | 0.10 | >90 | <1.0 | 0.085 | 23 | 0.13 | low flammability | >15 | >1.3 |
| 8 | 17 | 0.034 | 1.3 | 0.08 | >90 | 2.5 | 0.15 | 10 | 0.07 | low flammability | >10 | >1.3 |
| 9 | 12 | 0.036 | 2.2 | 0.18 | >90 | 1.0 | 0.085 | 20 | 0.07 | low flammability | >25 | >1.3 |

EXAMPLE 10

A spray-dried melamine-formaldehyde precondensate (molar ratio 1:3, molecular weight about 400) was added, in an open vessel, to an aqueous solution containing 3% of formic acid and 2% of sodium dodecylbenzenesulfonate, the percentages being based on melamine resin. The concentration of the resin, based on the mixture of resin and water, was 74.0% and the viscosity 230 dPas. The mixture was stirred vigorously and 33% of trichlorotrifluoroethane was then added. Stirring was continued (for about 3 minutes) until a homogeneous dispersion was formed. Part of this dispersion was applied to a polyethylene sheet and placed on the bottom of a treatment chamber, which consisted of a 1 m high polypropylene cylinder, having a diameter of 35 cm and internally lined with a foam polystyrene sheet. The treatment chamber was irradiated from above and below, using a magnetron as the source of ultra-high-frequency irradiation. The frequency was 2.45 GHz and the power taken up by the mixture was 110 KW per kg of water. The mold release time, i.e. the time required for foaming and hardening, was about 60 seconds.

The freshly prepared, 1 m high foam was then heated at about 230° C. for 20 minutes. Thereafter the foam block was cut into 10 cm thick panels, which were repeatedly milled by compression to about 70% of their original thickness.

The properties of the products are shown in the following Table.

TABLE

| | |
|---|---|
| Overall density | 4 [g·l⁻¹] |
| Heat conductivity | 0.04 [W·m⁻¹·°K.⁻¹] |
| Compressive strength | 0.18 [N·cm⁻²] |
| Recovery | 95% |
| Modulus of elasticity | 0.6 [N·mm⁻²] |
| Deflection at break | 20 mm |
| Permanent set | 6% |
| Dynamic rigidity | 1.3 [N·cm⁻³] |
| Building material category | B 1 (low flammability) |

EXAMPLE 11

A 71% strength aqueous solution of a melamine-formaldehyde precondensate (molar ratio 1:2, modified with 6% of sodium bisulfite), having a viscosity of 50 Pas, together with 1% of sodium $C_{12}$–$C_{18}$-alkysulfonate, 1% of an emulsifier consisting of a sulfated tallow alcohol modified with 100 moles of ethylene oxide per mole of alcohol, 1.8% of formic acid and 20% of trichlorotrifluoroethane (the percentage being based on solid resin) were emulsified in an open vessel by means of a high-speed stirrer. A part of the homogeneous emulsion was applied to the bottom of a treatment chamber of size 80×80×80 cm, the walls of which consisted of glass mat-reinforced polyester, of 10 mm thickness. The treatment chamber was irradiated from above and below, using a magnetron of 2.45 GHz frequence. The power taken up by the mixture was 75 KW per kg of water. The time for foaming and hardening was about 2 minutes.

Immediately thereafter, the material was heated, while exposed to the same radiation energy density, for 5 minutes. During this period, the power uptake was increased continuously at the rate at which water escaped from the foam. Immediately after removal from the chamber, the freshly produced foam showed 3.5% linear shrinkage and was absolutely dry. In air, it gradually took up moisture, up to an equilibrium content of 5% by weight. This was accompanied by slight swelling, so that the total shrinkage was 3.0%. The final foam block, which was 80 cm thick and had a density of 4.5 g.l⁻¹, was then cut into 10 cm. thick panels.

What is claimed is:

1. A resilient reticulated foam based on a melamine/formaldehyde condensate which contains not less than 50% by weight of melamine and formaldehyde as condensed units, and from 0 to 50% by weight of other compounds selected from the group consisting of alkyl-substituted melamine, urea, urethanes, carboxylic acid amides, dicyandiamide, guanidine, sulfurylamide, sulfonic acid amides, aliphatic amines, phenol and phenol derivates and containing amino, amide, hydroxyl or carboxyl groups and capable of forming thermosetting resins, and aldehydes selected from the group consisting of acetaldehyde, trimethylolacetaldehyde, acrolein, benzaldehyde, furfuraldehyde, glyoxal, phthalaldehyde and terephthalaldehyde and which react therewith to form such resins, as co-condensed units, which resilient foam exhibits the following properties:
  (a) the bulk density, measured according to DIN 53,420, is from 4 to 80 [g.l⁻¹];
  (b) the heat conductivity measured according to DIN 52,612, is less than 0.06 [W.m⁻¹.°K⁻¹];
  (c) the compressive strength, measured according to DIN 53,577 at 60% compression, divided by the bulk density, is less than 0.30 [N.cm⁻²/g.l⁻¹], and in determining the compressive strength at 60% compression the foam must recover to not less than 90% of its original height;

(d) the modulus of elasticity, measured by methods similar to DIN 53,423, divided by the bulk density is less than 0.25 [$N.mm^{-2}/g.l^{-1}$];

(e) the deflection on break, measured according to DIN 53,423, is greater than 9 [mm]; and (f) the foams are of not more than normal flammability when assessed according to DIN 4,120.

2. A resilient reticulated foam as set forth in claim 1, which contains not less than 80% by weight of melamine-formaldehyde as condensed unit.

3. A resilient reticulated foam set forth in claim 1, in which substantially 100% by weight of the foam is made up of melamine and formaldehyde condensed units.

4. A resilient reticulated foam as set forth in claim 1, wherein the molar ratio of compounds capable of forming a thermosetting resin to aldehyde is from 1:1.5 to 1:4.5.

5. A resilient reticulated foam as set forth in claim 2, wherein the molar ratio of compounds capable of forming a thermosetting resin to aldehyde is from 1:1.5 to 1:4.5.

6. A resilient reticulated foam as set forth in claim 3, wherein the molar ratio of compounds capable of forming a thermosetting resin to aldehyde is from 1:1.5 to 1:4.5.

7. A resilient reticulated foam as set forth in claim 1, wherein the molar ratio of compounds capable of forming a thermosetting resin to aldehyde is from 1:2.5 to 1:3.5.

8. A resilient reticulated foam as set forth in claim 2, wherein the molar ratio of compounds capable of forming a thermosetting resin to aldehyde is from 1:2.5 to 1:3.5.

9. A resilient reticulated foam as set forth in claim 3, wherein the molar ratio of compounds capable of forming a thermosetting resin to aldehyde is from 1:2.5 to 1:3.5.

10. An open-cell reticulated foam based on a melamine-formaldehyde condensate set forth in claim 1 which contains not less than 50% by weight of melamine and formaldehyde as condensed units, and up to 50% by weight of other compounds containing amino, amide, hydroxyl or carboxyl groups and capable of forming thermosetting resins, and aldehydes which react therewith to form such resins, as cocondensed units, wherein the foam structure comprises a plurality of mutually connected three-dimensionally branched webs, which webs conform to the following:

(a) the mean length/width ratio must be greater than 10/1; and (b) the density of the webs must be greater than 1.10 g/cm$^3$.

11. A resilient reticulated foam as set forth in claim 1, which foam further contains from 1 to 20% by weight of hydrogen sulfite anions based on the weight of the bisulfite compound which is the source of the anions and with respect to the weight of the melamine-formaldehyde resin.

12. A resilient reticulated foam as set forth in claim 1, wherein the compressive strength of the foam (c) is less than 0.20.

13. A resilient reticulated foam as set forth in claim 12, wherein the deflection on break (e) is greater than 12 (mm).

14. A resilient reticulated foam as set forth in claim 13, wherein the foam has low flammability when assessed according to DIN 4,102.

15. An open-cell reticulated foam as set forth in claim 10, which foam further contains from 1 to 20% by weight of hydrogen sulfite anions and with respect to the weight of the melamine-formaldehyde resin.

16. An open-cell reticulated foam as set forth in claim 10, wherein the density of the webs is greater than 1.20 g/cm$^3$.

17. An open-cell reticulated foam as set forth in claim 10, wherein the density of the webs is greater than 1.30 g/cm$^3$.

18. An open-cell reticulated foam as set forth in claim 10, wherein the mean length/width ratio is greater than 12/1.

19. An open-cell reticulated foam as set forth in claim 10, wherein the mean length/width ratio is greater than 15/1.

20. An open-cell reticulated foam as set forth in claim 10, wherein the mean length/width ratio is greater than 15/1; and the density of the webs is greater than 1.30 g/cm$^3$.

* * * * *

UNITED STATES PATENT AND TRADEMARK OFFICE
CERTIFICATE OF CORRECTION

PATENT NO. : 4,540,717
DATED : September 10, 1985
INVENTOR(S) : Harald Mahnke et al.

It is certified that error appears in the above—identified patent and that said Letters Patent is hereby corrected as shown below:

CLAIM 1, column 17, line 10, "4,120" should read --4,102--.

Signed and Sealed this

Nineteenth Day of November 1985

[SEAL]

Attest:

Attesting Officer

DONALD J. QUIGG

Commissioner of Patents and Trademarks